United States Patent [19]
Hsu et al.

[11] Patent Number: 5,545,325
[45] Date of Patent: Aug. 13, 1996

[54] COMBINED AEROBIC & ANAEROBIC TREATING METHOD & FACILITY FOR HOG WASTEWATER

[75] Inventors: Robert J. Hsu; Bao-Lin Sun, No. 16, Alley 45, Lane 30, 1st Section, Liu-Chiao West Road, Kangsan District, both of Kaohsiung County, Taiwan

[73] Assignee: Bao-Lin Sun, Kaohsiung County, Taiwan

[21] Appl. No.: 294,508

[22] Filed: Aug. 23, 1994

[51] Int. Cl.⁶ .................................................. C02F 3/30
[52] U.S. Cl. ........................ 210/605; 210/624; 210/630; 210/195.3; 210/202
[58] Field of Search .................................. 210/605, 626, 210/629, 630, 624, 195.1, 195.3, 202, 221.1, 532.2; 261/28, 35

[56] References Cited

U.S. PATENT DOCUMENTS

| | | | |
|---|---|---|---|
| 934,917 | 9/1909 | Huhsman | 210/532.2 |
| 1,790,975 | 2/1931 | Dallas et al. | 261/35 |
| 1,902,171 | 3/1933 | Kopp | 210/532.2 |
| 2,792,125 | 5/1957 | Gallacher | 210/532.2 |
| 3,563,888 | 2/1971 | Klock | 210/629 |
| 3,681,236 | 8/1972 | Bergles et al. | 210/605 |
| 3,755,156 | 8/1973 | Yakovlev et al. | 210/605 |
| 3,904,524 | 9/1975 | Pelton et al. | 210/532.2 |
| 4,824,563 | 4/1989 | Iwahori et al. | 210/195.1 |
| 4,904,387 | 2/1990 | Jordan | 210/605 |
| 4,919,815 | 4/1990 | Copa et al. | 210/605 |
| 4,933,076 | 6/1990 | Oshima et al. | 210/605 |

*Primary Examiner*—Christopher Upton
*Attorney, Agent, or Firm*—Bacon & Thomas

[57] ABSTRACT

A combined aerobic and anaerobic treating method and facility for treating hog wastewater, in which, wastewater flows through six consecutive steps, namely: ① raw wastewater tank ② grit removal chamber ③ natural solid-liquid separation device ④ equalization basin ⑤ aeration tank and ⑥ final clarifier, and is effectively treated by way of microbiological technology, without adding any chemical precipitatant or coagulant, from highly polluted hog wastewater to qualified effluent for normal discharge. Not only can it help reduce river pollution, but also will be free from secondary pollution by adding chemical additives. An organic fertilizer, which can be directly utilized is a by product.

10 Claims, 5 Drawing Sheets

1

COMBINED AEROBIC & ANAEROBIC TREATING METHOD & FACILITY FOR HOG WASTEWATER

FIELD OF THE INVENTION

The present invention relates to a treating method and facility for hog wastewater, more particularly, using a combined aerobic and anaerobic treating process and facility.

BACKGROUND OF THE INVENTION

Although the livestock wastewater causes severe water pollution, only few people recognize the extent of the pollution. Taking hog wastewater as an example, Taiwan raised at least 10 million heads of hogs which is 0.5 hog raised per person in average, making the highest ratio between hog and population in the world, according to official statistics. The average daily excreta per hog is six times higher than that of human beings, therefore, in case untreated hog wastewater is discharged into rivers, the accumulated pollution will cause serious problems.

To solve said severe pollution problem, the government has made unsparing efforts into the research and development on pollution control measures. However, most of them adopted use methane fermentation techniques. The failure to successfully separate solids from liquids results in high BOD (Biochemical Oxygen Demand) value and SS (Suspended Solids) for normal discharge. Moreover, it requires adding of chemical precipitatant or coagulant to help in sedimentation and condensation, thereby causing secondary pollution. Although said technique claims the byproduct of methane gas, it is impractical to commercialize as the fuel for power generators, vehicles and boilers due to the consideration on cost-effect and the fact that it requires great a investment in additional facilities. Therefore, no matter what incentives the government proposed, owners are hesitate in taking advantage of said techniques and livestock wastewater still poses great threats to our living environment.

Furthermore, the long and overdosed use of chemical fertilizers in agriculture has acidified Taiwan's soil that has not only impaired plants growth, but also caused yield reduction. Most farmers resort to higher dosage to increase output, causing the soil to be further acidified. To avoid such a vicious cycle, the best way is that we should give up chemical fertilizers for more natural organic ones. Excreta in the livestock wastewater is picked up directly by the way of mechanical separation of solid and liquid, which is then delivered outside for traditional piling treatment. However, the excreta produced based on above-mentioned method is unstable in physical and chemical properties, giving out nuisant odors under normal temperature and reducing value benefit, as well as causing great burdens to environmental sanitation.

The inventor has realized the above-mentioned defects in traditional techniques, which can hardly slove the existed livestock wastewater pollution problems, and made a best effort for better methods to turn trash into treasure based on his experiences on environment protection engineering in the field of research and development and success after numerous tests and improvements.

SUMMARY OF THE INVENTION

The primary purpose of the invention is to provide a treating method and facility which can combine anaerobic fermentation and aerobic activated sludge biodegradation and treat hog wastewater effectively by microbiological techniques in order to meet the national requirements on effluent.

Another purpose of the invention is to provide a treating method and facility which can decrease BOD and SS values by decomposing organic suspended matter effectively without the need to add any chemical precipitatant or coagulant.

Thirdly, the invention is to provide a treating method which can separate solid from wastewater in a natural way, and can produce a highly economical organic fertilizer byproduct for direct use on soil fertility improvement. The above and other objects, features, and advantages of the present invention will become more apparent from the following description when taken in conjunction with the accompanying drawing in which preferred embodiments of the present invention are shown by way of illustrative example.

DESCRIPTION OF THE PREFERRED EMBODIMENTS

Figure 1:
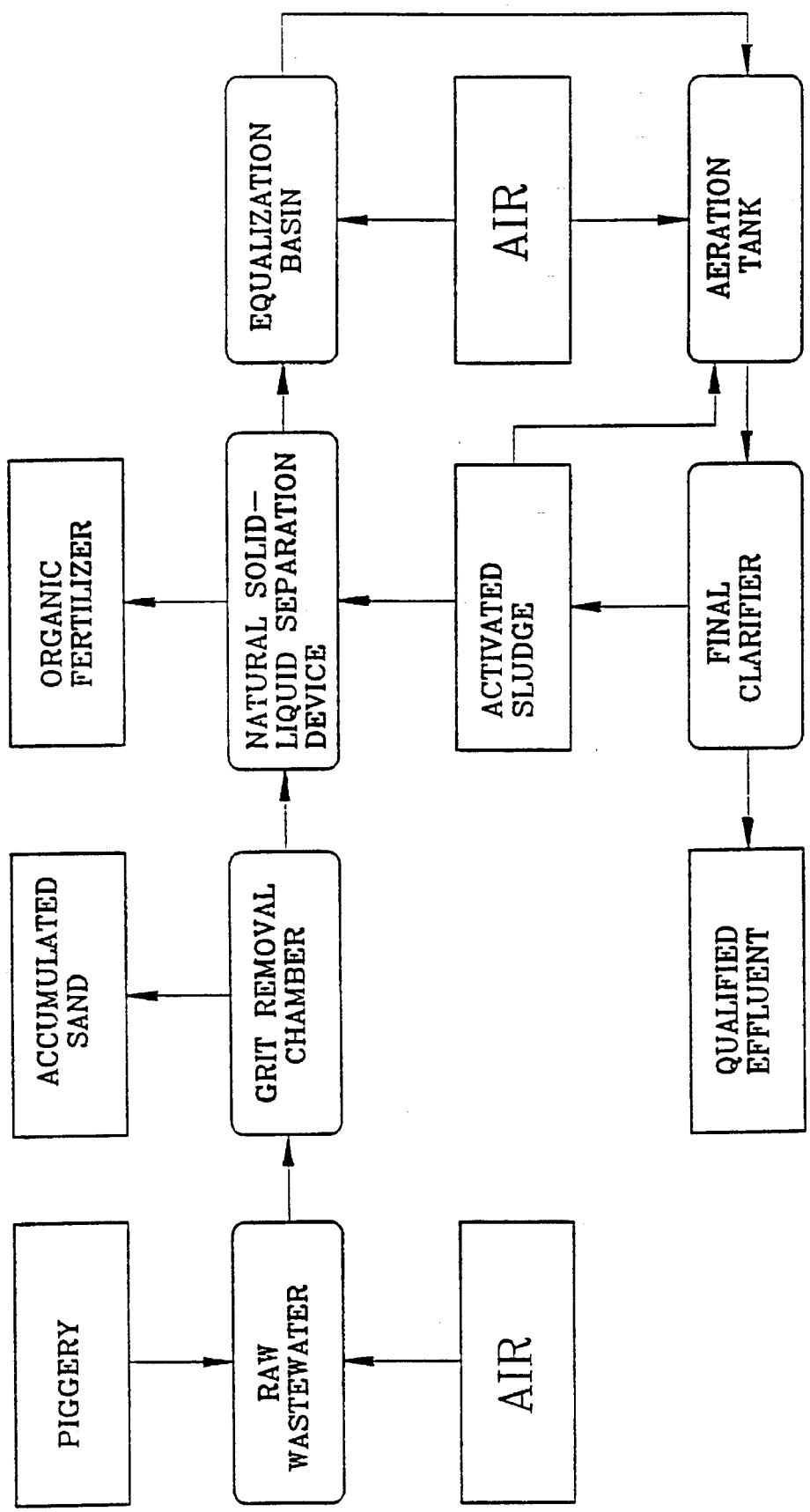
FIG. 1: Flow diagram of the present invention.
Figure 2:
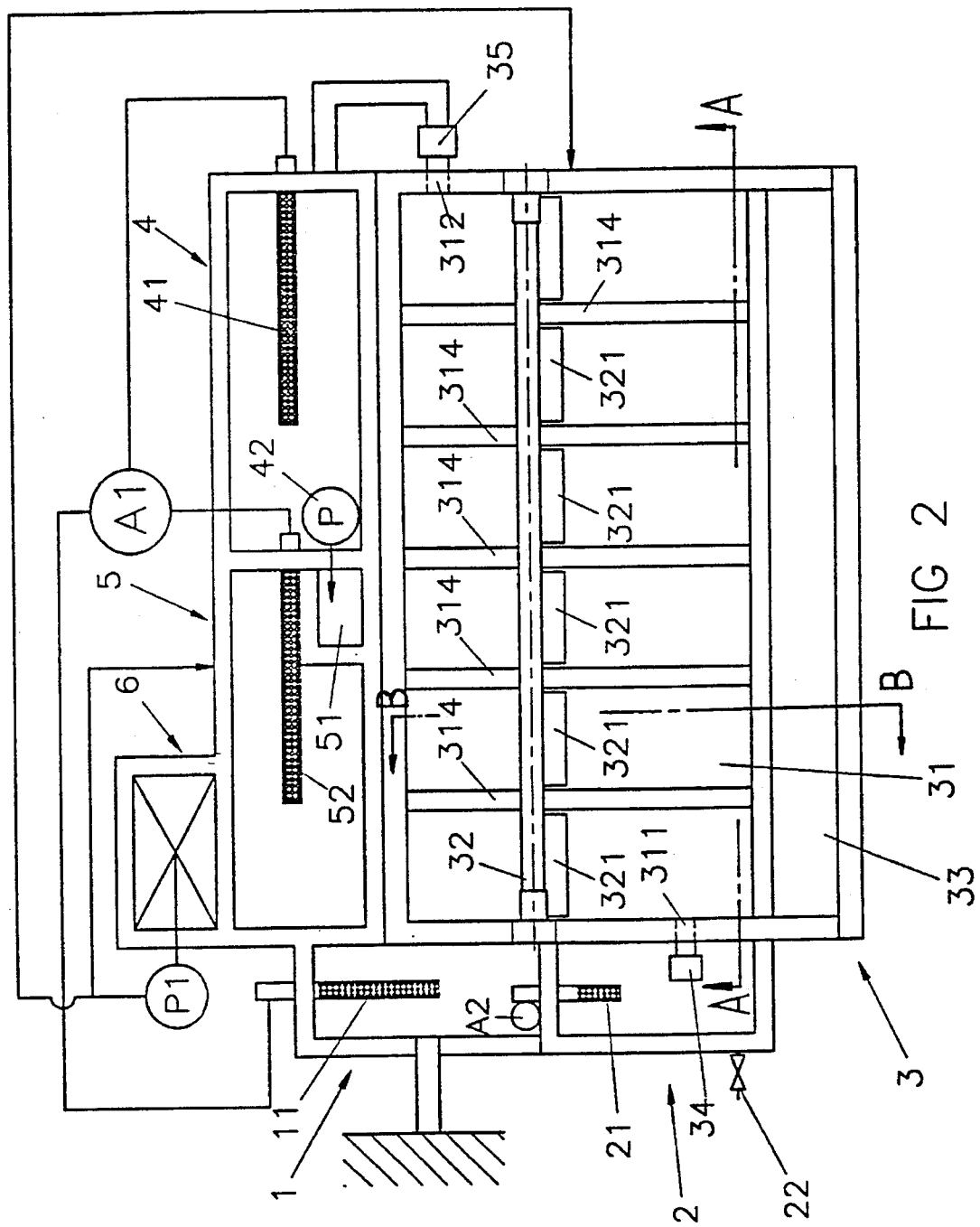
FIG. 2: Top view of the treating facility of the present invention.

As illustrated by FIG. 1 and 2 the present invention "Combined Aerobic and Anaerobic Treating Method and Facility for Hog Wastewater" treats hog wastewater through six units, including: ① raw wastewater tank ② grit removal chamber ③ natural solid-liquid separation device ④ equalization basin ⑤ aeration tank and ⑥ a final clarifier in sequence, so that it can meet government's ever stricter regulations for final discharge. The operation procedures and devices are listed below for further details.

1. Raw wastewater tank (1): which is connected with the drainage system of the piggery for collecting wastewater from flushing combined with excreta. In average, a hog produces some 20~50 kilograms of excreta along with flushing water daily. Therefore, the capacity of the raw wastewater tank (1) shall be designed according to the numbers of hogs raised, in which, the tank (1) is made by digging downward into the earth and then constructed with concrete and steel, the ideal depth of the tank is approximately 1.8 meters, while the length and width (dimension) depend upon the required capacity and the size of land. One mixer (11) is installed in the center of the tank (1) for thoroughly blending excreta solids with liquids so as to avoid being sedimentated to the bottom of the tank (1). An air blower (A1) can be used to induct air into the tank (1) to cause the turbulant flow for better stiring through a guiding pipe.

2. Grit removal chamber (2): which is a rectangular aboveground water tank, constructed with concrete and steel structure, in which, the chamber (2) is installed with a perforated pipe (21) of approximately 3 inches in diameter, 1.5 meters in length and supplied with several evenly distributed holes at the end of the pipe. Through the match of the perforated pipe (21) and the air blower (A2), wastewater from the raw wastewater tank (1) flows into the grit removal chamber (2) and is distributed through the holes of the perforated pipe (21) to break large chunks of solid excreta. The perforated pipe (21) is located ⅓ above the bottom of the tank (1) so that sand will sediment and crushed excreta with wastewater will overflow from the opening at the top of the grit removal chamber (2) and be inducted into the lower part of anaerobic digester (31) through the inlet, ¼ above the bottom of said digester. One outlet valve (22) shall be installed at the lower part outside the chamber (2) so as to clean and discharge the accumulated sand through said valve (22).

Figure 3:
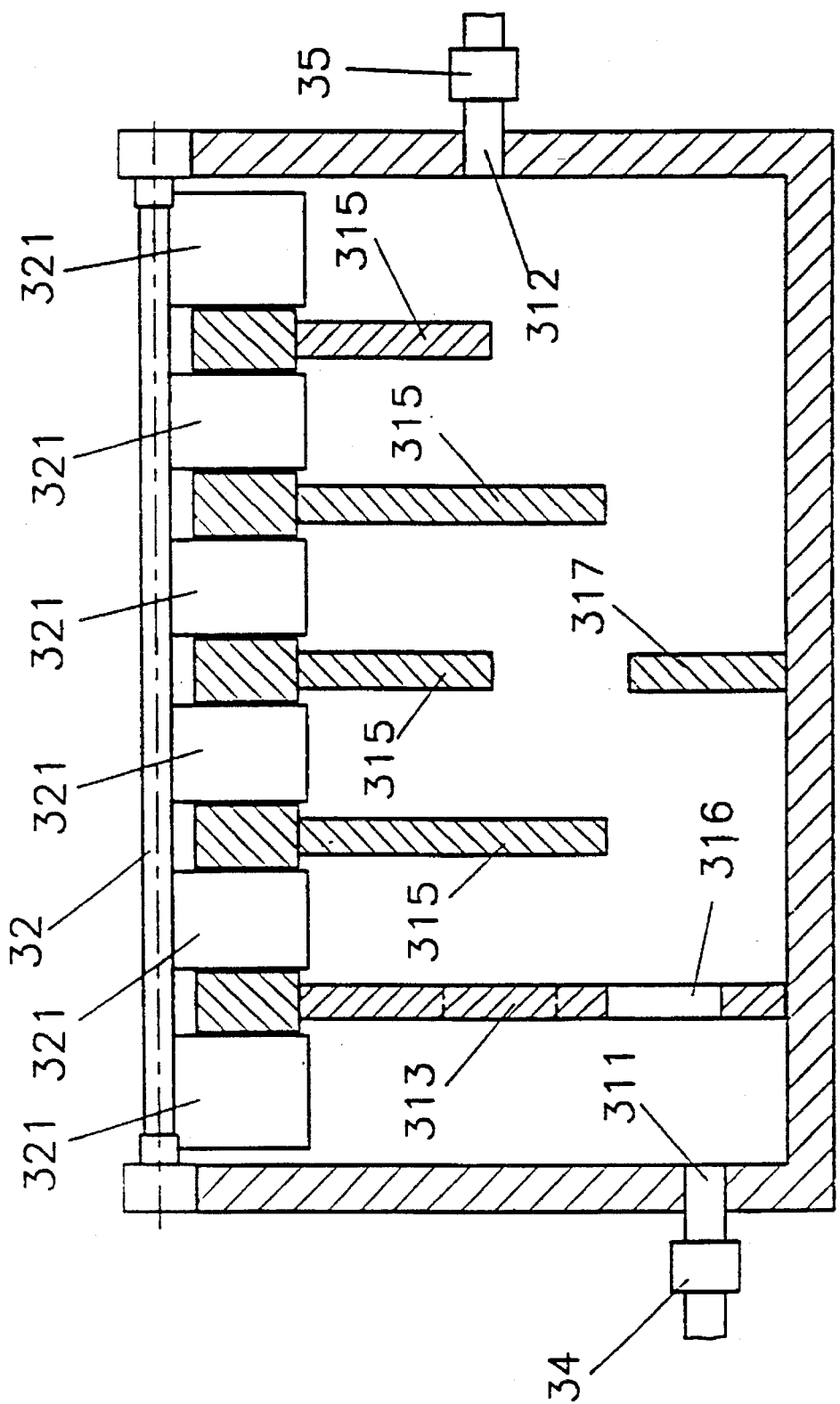
FIG. 3: Cross-sectional view along line A—A in FIG. 2 of the natural solid-liquid separation device of the present invention.
Figure 4:
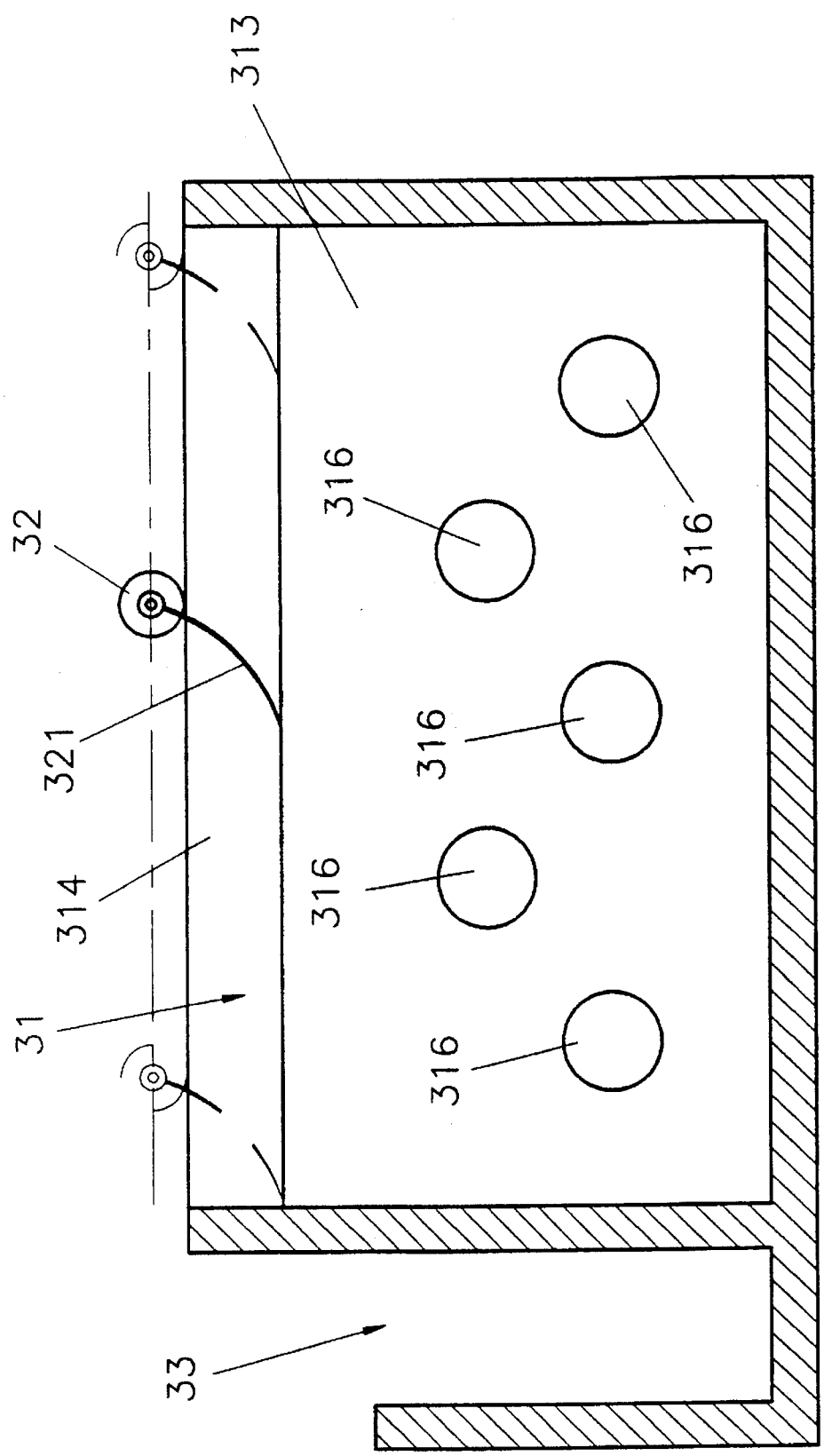
FIG. 4: Cross-sectional view along line B—B in FIG. 2 of the natural solid-liquid separation device of the present invention.

3. Natural solid-liquid separation device (3): which is constructed with a digester (31), an automatic excreta skimmer (32), a storage tank (33), a level-sensing control valve (34) and a timing electrically-driven control valve (35); in which, said digester (31) is equipped with inlet (311), outlet (312), flow baffle (313), supporting beam (314), flow-guiding plate (315), and flow-guiding hole (316), and baffle (317). Referring to FIGS. 2,3 and 4, said digester (31) has a depth of 1.5~2.0 meters, with a size depending on the topography and needs. The capacity of said digester (31) is ideally designed to fit the numbers of hogs raised, which in average is based on a piggery raising 100 hogs producing some 8–15 metric tons of wastewater. In case of overdesign in capacity, the cost including land needed shall be higher. On another hand, the fermentation process shall be incomplete if the capacity designed for digester is smaller. As referring to FIG. 2 & 3, said inlet (311) is istalled at the starting point of flow-guiding wall of said digester (31) and is close to the bottom of said digester (31); said outlet (312) is installed at the end of flow-guiding wall of said digester (31) and is close to the middle of said digester (31). Said inlet (311) is equipped with a level-sensing control valve (34) and a timing electrically-driven control valve (35) for said outlet (312). Several supporting beams (314) are horizontally installed on the top of said digester (31) so as to install said baffle (313) and said plate (315). The number of said beam (314) depends on the width of said digester. Generally, it needs one said beam (314) for 2 to 4 meters in average and said beam can be used as the path way for operators on said digester (31) and as the supports for installing said skimmer (32). Said baffle (313) is designed to be placed below said beam (314) which is the closest to said inlet (311) and extends to the bottom of said digester (31), in which, the height of said plate (315) is less than that of said digester (31), at a height of 1.0 to 1.5 meters. Several flow-guiding holes (316) are supplied on said plate (313) and have a diameter of some 30 to 60 centimeters. Said plate (313) can be designed in the geometric shapes such as round, ellipse or rectangular and installed at the place that is next to said plate (315) at a distance of some 30 to 70 centimeters with a measure that places the longer plates and the shorter plates in sequence.

The lower ends of the rest of beams (314) supports plates (315) having a width the same as that of said digester (31) and being suspended state and not touching the bottom of said digester (31) for the lower end of said plates (315) which is installed in the manner of placing the longer plates and the shorter plates in sequence so as to ensure the flow of water to be interchanged upward and downward due to the differences in height of said plates (315) while water flows internally in said digester (31). Furthermore, the bottom of said digester (31) is equipped with several baffles (317) which are supplied to match with several plates (315) to generate the flow-guiding effect and to impede the suspended matter in the water with the result in decreasing the flow velocity from said inlet (311) to said outlet (312) of said digester (31). The automatic exereta skimmer (32) is set on the upper portion of said digester (31) with the aid of using said beams (314) as the support, and can be driven by gear, belt rail, chain, or chain wheel to activate the scrapers (321) to scrape fermentated excreta into said tank (33) automatically. Said tank (33) is set on the outer side of said digester (31), which has a capacity and shape depending on both the practical quantity of input and the convience on cleaning and transportation. The wall heights of both said digester (31) and said tank (33), are lower than those of neighboring tanks and the same as the bottom end of said scraper (321) of said skimmer (32) as shown in FIG. 4.

According to the present invention, the operation procedure of said device (3) is to control the quantity of wastewater after grit-removal treatment flowing into said digester (31) and having fermentated through said inlet (311) by means of said valve (34) located under said digester (31) so as to prevent wastewater from over-flowing. Said raw wastewater flowing into said digester (31) is going to flow along said baffle (313) and flow channel between said plate (315) and said baffle (317), in which, the level of wastewater in said digester (31) shall not be higher than the upper ends of said baffle (313) and said plates (315). The more of said plates (315), the longer the reaction time is. This prolongs the retention time and increases the degree of complete reaction on said anaerobic fermentation, in which the time needed for anaerobic fermentation is 1.8~3 days in average. After anaerobic fermentation, excreta shall be biodegraded into lighter ones suitable for using as highly-effective organic fertilizer and float on the surface of said digester (31) and form a natural shielding layer to prevent air penetration, thereby creating a satisfactory condition for anaerobic biological bacteria and effectively keeps excreta in the lower layer from further fermentation and generating the lighter ones and continuing to float on the surface of the tank resulting in accomplishing the function of separating solid from liquid waste naturally. The fermented excreta shall become a most economical organic fertilizer ready for direct use. Said skimmer (32) can sweep off the fermented excreta floating on the surface into said tank (33) located at the outer side of the digester (31). In the skimming process, said float fermented excreta is to be swept off for some ⅓ of its total thickness approximately in every 1~3 days and so as not to sweep off all its float fermented excreta, leaving in an appropriate thickness of said excreta for shielding air to maintain the effective anaerobic fermentation process. Said excreta shall be periodically skimmed off, otherwise, fermented excreta will be difficult to float upwardly due to the resistance caused by the float excreta in case a fixed part of the sludge-shaped excreta is not skimmed off for several days. Hardening of unskimmed excreta will happen and the lower part of fermented excreta shall be redissolved. As a result, this bad cycle is going to lower the effects on solid and liquid separation and the suspended matter contents of wastewater will be increased. This is the reason why it is necessary to skin off the float fermented excrata on time according to the present invention. Furthermore, separated liquid after solid and liquid separation can lower (discharge) the liquid level while said digester (31) is in the stagnant state to eusure fermented liquid to flow into next unit for continuing treatment. The recommended discharging period is generally from 1 A.M. to 7 A.M. and the discharging level is some 50–70 centimeters, or 80 to 100% of daily discharged wastewater quantity for the piggery as the basis. All of this can increase the fermentation effects and can utilize said digester (31) to retain all daily generated wastewater for anaerobic fermentation reaction, in which treated wastewater containing 10~25% of suspended solids is accidentally discharged and increases the load of successive treatments if said outlet (312) is installed on the bottom of said digester (31). Oppositely, a large part of fermented excreta will be discharged if said outlet (312) is set on the upper part of said digester (31). Therefore, said outlet (312) is equipped with the end of flow-guiding plate of said digester (31) at half its height of said digester (31). Meanwhile, said outlet (312) is supplied with a timing electrical-driven control valve (35), which can be activated at a designed time to control the wastewater level. By means of above-mentioned theory and operation, the present invention can offer an excellent natural solid and liquid separation performance for said wastewater.

Figure 5:
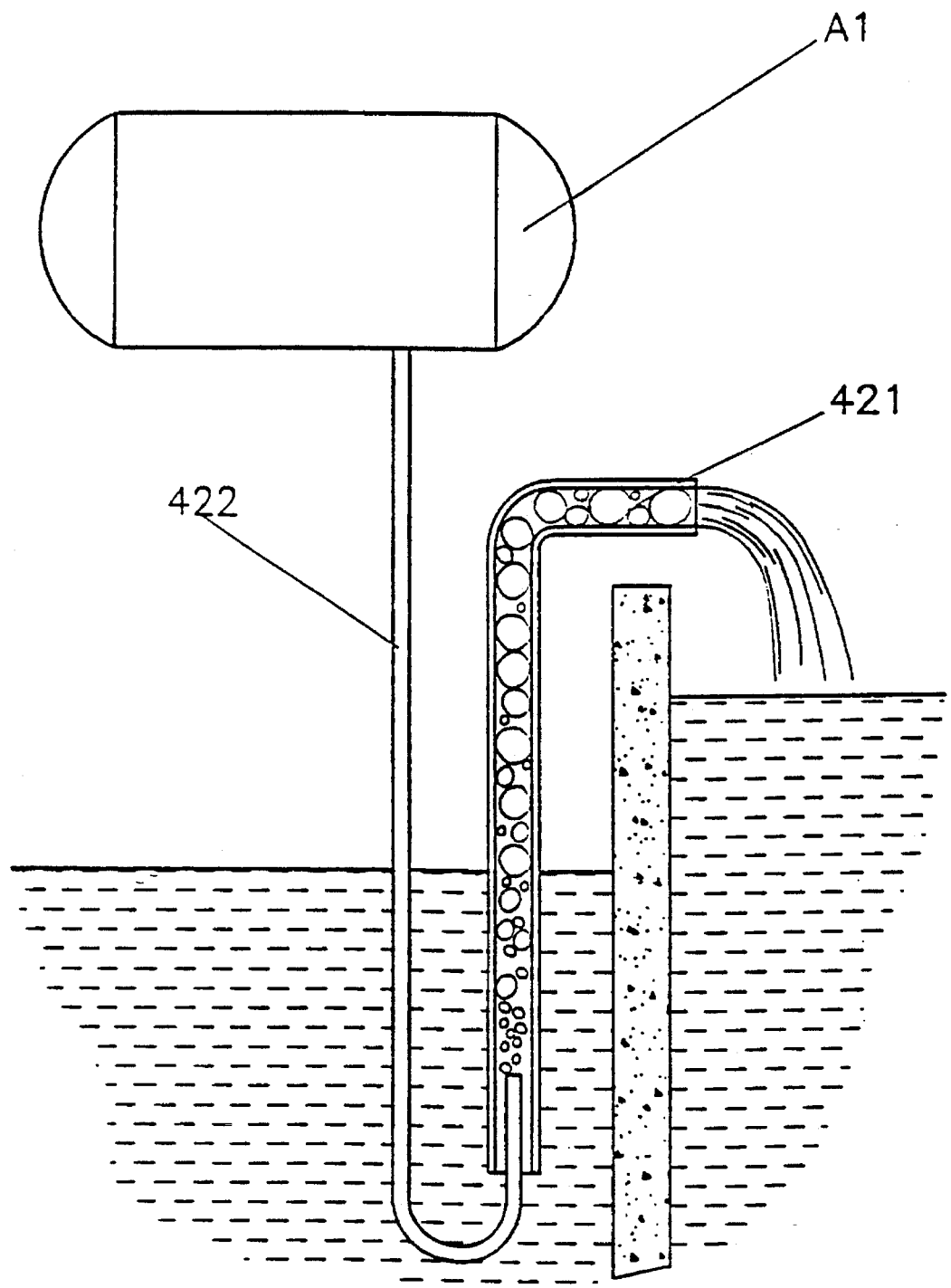
FIG. 5: Illustrative cross-sectional view of pneumatic type water pumping device of the present invention.

4. Equalization basin (4): which is a rectangular of concrete and steel structure for temporarily accommodating wastewater after anaerobic fermentation before flowing into the aeration tank (5) and adjusting the quantity of wastewater to be treated in said tank (5). If necessary, it can be used to adjust the quality of wastewater by installing an aerator (41) in the basin (4) to dissolve more oxygen in the wastewater and to prevent the suspended organic matter from sedimentation and also to blend organic particulate with water thoroughly for aerobic activated sludge reaction in the next process. In addition, a pneumatic type water pump (42) shall be installed in the basin (4) as shown in FIG. 5, in which, said pump (42) includes a pumping guide pipe (421), a vent pipe (422) and a air blower (A1), said pipe (421) is installed in said basin (4) with the water-immersed lower opening and the aerator (5)-flown upper opening; said pipe (422) has a smaller diameter than that of said pipe (421) with a ratio of approximate in 1:5~2:5, which said pipe (421) shall have a diameter of some 1.0~5.0 inches if that of said pipe (422) is about 0.4~1.0 inch. The upper opening of said pipe (422) is connected to an air blower (A1) and has a U-shape curved lower opening so as to ensure the lower opening is extended into said pipe (421), in which, the lower opening of said pipe (422) has a distance of some 20 to 50 centimeters extended into said pipe (421). As a result, air pump (A1) shall be activated to pump out liquid upward by inducing gas into it and shall detach bacteria or sludge adsorbed on the wall of said pipe (421) through the gas-inducing process which shall generate turbulant flow and prevent bacteria or sludge from enbedding as well as keeping the pipeline from solid depositing or plugging. Meanwhile, the inducing of part of generated gas from said aerator (5) into said pipe (421) through air blower (A1) can not only effectively pump wastewater into next unit for further treatment, but can also prolong the operating time for said pump (42) and keep the pipeline from sludge-plugging. Therefore, the present invention has the advantages on power-saving, effective usage of relative facilities and cost-reduction.

5. Aeration tank (5): which is a continuous operation process, in which, aerobic reaction by mass-incubated activated sludge (a kind of microorganics) is carried on to biodegrade organic compounds in wastewater to reduce the BOD and SS value; and aeration device (52) installed in the tank (5) for increasing the oxygen content in the tank (5) to allow wastewater to flow into a small water tank (51) before flowing into the tank (5) so as to adjust the water quantity for allowing only a small amount of wastewater flowing into the tank (5) for aerobic activated sludge treatment at a time to ensure the completion of the aerobic reaction and effluent discharged complying the national effluent standards.

6. Final clarifier (6): which is the last process unit in the present invention, in which, the bottom of the clarifier is like a tilting funnel so as to accumulate sedimentary sludge and wastewater shall fully react with the activated sludge in the tank (5), produce a mixture, a clear water and activted sludge, and then overflow into clarifier (6) for settling. The activated sludge in the wastewater will settle to the bottom after sedimentation and then clear effluent can naturally be separated from activated sludge. The sedimentary sludge can be drawn off with the aid of a guiding pipe dipped into the bottom of the clarifier (6) by the pump (P1) so as to allow some ¼ of the sludge flow back to said digester (31), while the other ¾ shall be sent to said tank (5) and blended into the fermented excreta to be a part of the organic fertilizer, achieving best economical "Zero Waste (Discharge)" process.

The time needed for the whole process according to the present invention is shorter than other traditional treatment. In average, it takes only 5.5 days, while other processes usually take 20–30 days. Comparatively, the present invention has the characteristics that can largely reduce the reaction time and demands less space than other processes. For a piggery of 1,000 hogs, the wastewater treating facility only demands 40 pings (about 132 sq.m.), especially is suitable for use in Taiwan area having the limited and most expensive land. In addition, the present invention adopts the theory that the density of fermented excreta shall be decreased and it shall float on liquid to complete separation operation for liquid waste; the fermented excreta is highly stable in chemical and physical properties, therefore, it shall not have nuisant odor, or attract mosquitoes or flies and then contribute to the environmental sanitation. Moreover, the produced excreta is in a chemically stable state and contains nutrient elements for plant growth and can largely help in improving the severely acidified soil of Taiwan to maintain the ecological environment quality.

What is claim is:

1. A facility for combined aerobic and anaerobic treatment of hog wastewater wherein the wastewater flows in an upstream to downstream flow direction, comprising: a raw wastewater tank; a grit removal tank located downstream of the raw wastewater tank; a natural solid-liquid separation device located downstream of the grit removal tank; an equalization basin located downstream of the separation device; an aeration tank located downstream of the equalization basin; and a final clarifier located downstream of the aeration tank, wherein comprises:

a) a digester, which is a generally square tank having an inlet to direct wastewater from said grit removal tank into said digester said digester comprising;
   i) a flow baffle extending generally vertically to a flow direction of said digester having the same width as the width of said digester and vertically extends to an upper end of said digester from a bottom of said digester and is fixed in the digester, the flow baffle having several flow-guiding holes located at different heights;
   ii) a plurality of flow-guiding plates, downwardly extending from an upper part of said digester across the width of said digester downstream of said flow baffle generally vertical to the flow direction, the flow guiding plates having different heights in sequence;
   iii) at least one baffle extending vertical to the flow direction upwardly from the bottom of the digester across the width of said digester so as to reduce the flow rate of suspended matter in the wastewater and generate a flow-guiding effect with the aid of the flow-guiding plates; and iv) a water outlet, located at an end portion of said digester for the flow of wastewater in said digester into the equalization basin;

b) an automatic skimmer, installed at the upper part of said digester for automatically skimming fermented excreta out of said digester;

c) a storage hopper, located adjacent to said digester for receiving and storing the fermented excreta from said automatic skimmer;

d) a level-sensing control valve, installed at the water inlet of said digester to control of wastewater volume in said digester; and e) a timing electrically-driven control valve, installed at the water outlet of said digester to control the wastewater level and discharging time;

whereby, with the above-mentioned assembled in sequence, organic fertilizer content in the wastewater can be effectively recovered for practical usage and treated wastewater is purified for normal discharge.

2. The facility for the combined aerobic and anaerobic treatment of hog wastewater according to claim 1, in which, the water inlet of said digester is located adjacent to the bottom of said digester for the inlet of raw wastewater and the water outlet is located approximately at the mid-point of the height of said digester.

3. The facility for the combined aerobic and anaerobic treatment of hog wastewater according to claim 1, further comprising a plurality of supporting beams installed at an upper portion of said digester extending across the width of said digester for supporting said flow baffles and said flow-guiding plates.

4. The facility for the combined aerobic and anaerobic treatment of hog wastewater according to claim 1, in which, the diameters of flow-guiding holes in said flow baffle are between 30 and 60 centimeters and wherein the flow baffle is located approximately 30–70 centimeters from an upstream end of said digester.

5. The facility for the combined aerobic and anaerobic treatment of hog wastewater according to claim 1, further comprising a pneumatic water pumping device located in the equalization basin for pumping wastewater into the aeration tank, wherein said pneumatic water pumping device comprises:

a) an air blower;

b) a water pumping pipe having an outlet end and an inlet end; and, c) a vent pipe, having a smaller diameter than that of said water-pumping pipe with an upper inlet opening connected to said air blower and a lower outlet opening extending into the inlet end of said water-pumping pipe, so as to direct air flow from the air blower into said water pumping pipe such that wastewater flows through said water pumping pipe resulting in wastewater being pumped into said aeration tank from said equalization basin.

6. The facility for the combined aerobic and anaerobic treatment of hog wastewater according to claim 5, in which, the ratio of the diameter of said water pumping pipe to the diameter of said vent pipe is between 5:2 to 5:1.

7. The facility for the combined aerobic and anaerobic treatment of hog wastewater according got claim 5, in which, the inlet end opening of said water pumping pipe extends between 20–50 centimeters below the lower outlet opening of said vent pipe.

8. A combined aerobic and anaerobic method for treating hog wastewater, comprising:

a) a mixing treatment in a raw wastewater tank which utilizes a mixing device operated by air from an air blower to mix collected excreta and wastewater in the raw wastewater tank to prevent solid excreta from sedimentation and accumulating at the bottom of the tank to ensure good flow conditions;

b) a chunk-breaking and accumulated sand treatment in which wastewater in the raw wastewater tank is drawn into a perforated pipe located at approximately ⅓ of the height of a grit removal chamber above the bottom of the grit removal chamber and then solid excreta together with wastewater are distributed through holes at the end of the perforated pipe under air pressure from the air blower so as to settle accumulated sand to the bottom of the grit removal chamber and make excreta and wastewater mix homogenously and ready for an anaerobic fermentation;

c) a natural solid-liquid separation by excreta wherein wastewater flowing into an anaerobic digester is fermented after passing through the grit removal chamber, in which, the flow rate of inlet wastewater into the anaerobic digester is controlled by a level-sensing control valve with the air of flow-guiding plate to increase the flow pattern and treating time to ensure that the fermented excreta is completely decomposed to a lighter product and floats on an upper surface to form a natural shield layer to prevent air from dissolving into the wastewater and create an active bed for anaerobic fermentation beneath the surface so as to ensure the complete fermentation of the excreta and convert it into a valuable organic fertilizer for direct use and skimming an upper layer of fermented excreta off by an automatic skimmer, leaving a predetermined certain thickness layer of fermented excreta on the surface to keep air out for maintaining further fermentation, wherein the fermented excreta passes into an equalization basin under a flow rate and level control by a timing electrically-driven control valve;

d) equalization treatment step for wastewater which utilizes an equalization basin to buffer the water flow rate into an aeration tank, in which oxygen-enriched fermented wastewater is pumped into the aeration tank by a submerged pump so as to adjust water volume in the aeration tank;

e) an aerobic biodegrading treatment step by activated sludge in the aeration tank proceeded by an aerobic biodegrading reaction by mass-incubated activated sludge to biodegrade organic suspended solid, and which continuously provides oxygen demanded for wastewater by the aeration device so as to decompose organics and inorganic suspended matter in wastewater, thereby reducing the biochemical oxygen demand and suspended solids values; and, f) recovering activated sludge by a clarification process which separates clear water generated by complete biodegradation with activated sludge treatment from activated sludge in the final clarifier, then discharging reacted clear water through an overflow levee while the activated sludge settles to the bottom of the clarifier and is pumped out such that ¼ of sludge is fed back to the aeration tank and the other ¾ is delivered to the anaerobic digester and mixed with fermented excreta as organic fertilizer.

9. The combined aerobic and anaerobic treating method for hog wastewater according to claim 8, in which, the time for anaerobic fermentation comprises between 1.8~3 days and the amount of said fermented float excreta skimmed off is ⅓ of the total thickness approximately every 1–3 days.

10. The combined aerobic and anaerobic treating method for hog wastewater according to claim 8, further comprising the liquid after solid and liquid separation to lower the liquid level while said digester is in a stagnant state to ensure that fermented liquid flows into the next unit for continuing treatment wherein the discharging period is from 1 A.M. to 7 A.M. and the discharging level is between 50–70 centimeters, or 80~100% of the daily discharged wastewater quantity.

* * * * *